Figure 1:
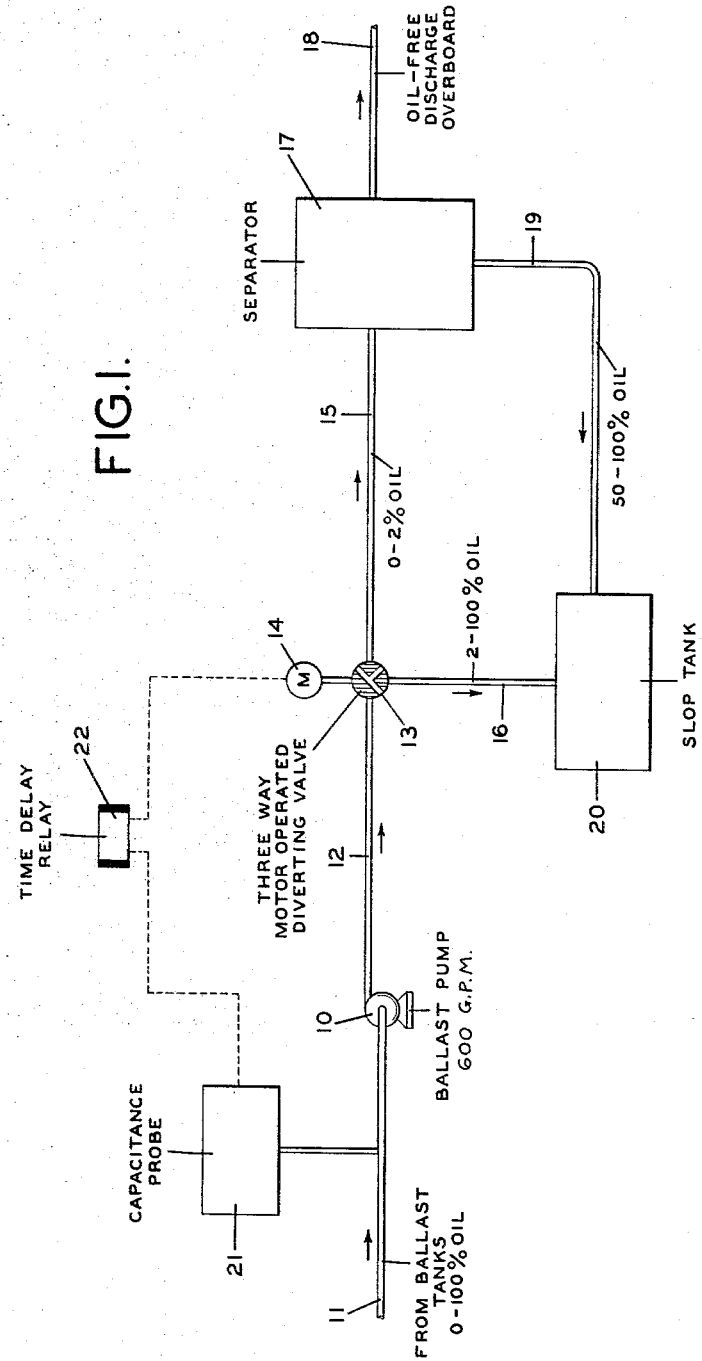

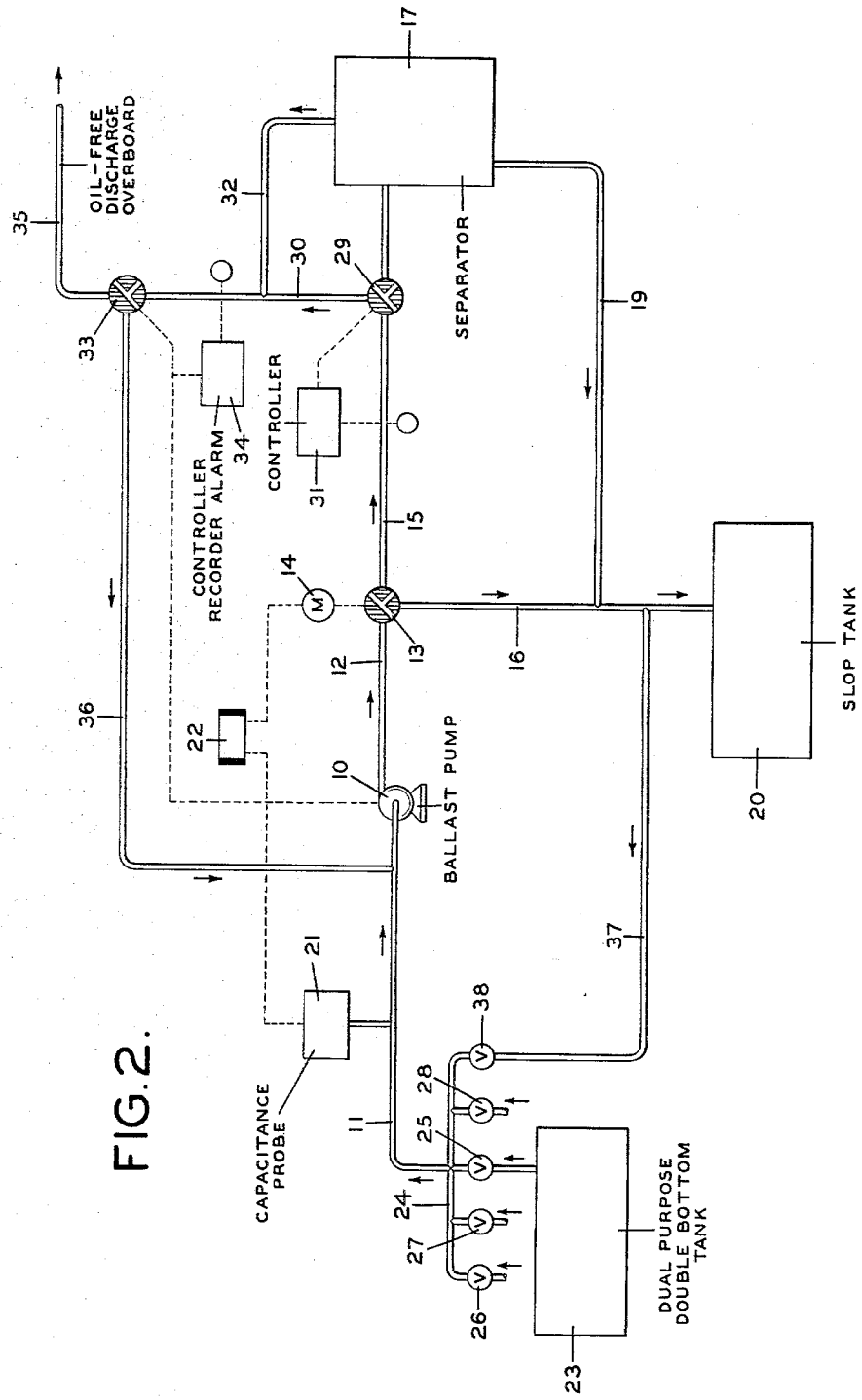

3,253,711
FLUID SEPARATION
William S. Young, Newtown Square, Pa., assignor to Pfaudler Permutit, Inc., Birmingham, N.J., a corporation of New York
Filed Dec. 31, 1962, Ser. No. 248,697
14 Claims. (Cl. 210—83)

The present invention relates to fluid separation and more particularly to the separation of fuel oil from ballast water.

As the fuel oil tanks on seagoing vessels become empty, it is customary to fill such tanks with sea water as ballast. The residual oil in the tanks mixes with the sea water and is later discharged overboard during a deballasting operation prior to refueling. Since such deballasting usually occurs in or near harbors, the oil content of the ballast water pumped overside may give rise to a serious pollution problem.

The principal object of the present invention has been to provide a novel and improved method and apparatus for separating residual fuel oil from ballast water prior to discharge of the ballast water overside.

Since the usual deballasting operation is rapid, a flow rate of 600 gallons per minute would not be unusually high, it is important that the separation system be able to operate efficiently at high through-put rates. Moreover, in view of the space limitations imposed by the necessities of maritime design and efficiency, a satisfactory separation system should be compact.

Another object of the invention has been the provision of a novel and improved method and apparatus for separating residual fuel oil from ballast water which operates efficiently at the high through-put rates commonly used in deballasting.

A further object of the invention has been to provide such a separation apparatus which is relatively compact.

Other and further objects, features and advantages of the invention will appear more fully from the following description taken in connection with the appended drawings, in which:

FIG. 1 is a schematic diagram illustrating the basic components of one form of system embodying the invention, and FIG. 2 is a schematic diagram similar to FIG. 1 but illustrating a somewhat more sophisticated system in accordance with the invention.

It has been found that when a ballast filled fuel oil tank is pumped out during a deballasting operation, the residual fuel oil is not evenly mixed with the ballast water. On the contrary, the oil concentration with vary from 0 to 100% and the bulk of the oil will come in relatively substantial slugs of almost 100% oil. Except for these slugs of oil, which occur largely near the beginning and ending of the deballasting operation, the pumps are handling relatively clean sea water. The concentration of the oil in the pumped fluid can readily be measured and hence the treatment accorded to the pumped fluid can be selected to meet the oil concentration present.

Referring now to the drawings and more particularly to FIG. 1, a ballast pump 10 draws fluid from the ship ballast tanks through a pipe 11. The fluid discharged from pump 10 is supplied through a pipe 12 to a three-way motor operated diverting valve 13. Valve 13 is operated by an electric motor 14 and, depending on the valve setting, may close off pipe 12, may connect pipe 12 to a pipe 15 or may connect pipe 12 to a pipe 16.

Pipe 15 delivers fluid to an oil-water separator 17 which may be of any suitable type. If the residual oil in the ballast tanks is Bunker "C," which is the name commonly given to No. 6 fuel oil as defined by the Bureau of Standards in Commercial Standard CS 12–48, the separator 17 is preferably of the type described and claimed in the copending United States patent application of W. S. Young and A. W. Kingsbury, Serial No. 233,821, filed October 29, 1962. The oil-free effluent of separator 17 is discharged overboard through a pipe 18. The oil separated in separator 17 is supplied through a pipe 19 to a slop tank 20.

Pipe 16 delivers fluid directly to slop tank 20.

Valve 13 will be set to deliver fluid to pipe 15 and thus to separator 17 when the oil content of the fluid from the ballast tanks is less than a predetermined amount. This amount will be dependent on the capacity and efficiency of separator 17 and on the permissible oil content of the water discharged overboard. In the case of Bunker "C" residual oil and a separator of the type described in the aforementioned Young and Kingsbury application, the valve 13 will usually be set to supply fluid to separator 17 when the oil content of that fluid is between about 0 and 2%. Where the oil content of the fluid from the ballast tanks exceeds the predetermined amount, e.g., 2%, valve 13 will be set to deliver the fluid from pipe 12 to slop tank 20.

As mentioned above, oil in the ballast fluid tends to come in slugs of almost 100% oil, and in the absence of such slugs the ballast fluid is relatively clean sea water which can readily be handled by separator 17 to achieve the desired freedom from oil content for the water discharged overside. Because the oil tends to come in slugs, the presence of such slugs in pipe 11 may conveniently be detected by a capacitance probe 21 which measures continuously the dielectric constant of the fluid in pipe 11. Since the dielectric constant of oil is many times less than that of sea water, a slug of oil will be easily detected. Detection of a slug of oil in pipe 11 operates a time delay relay 22 which in turn operates motor 14 to control valve 13. Time delay relay 22 is provided to insure that the probe 21 has detected a substantial slug or solid stream of oil and has not been affected by a small slug of oil passed in pipe 11. Time delay relay 22 similarly provides a time delay on release when detection shifts from oil to water to insure that valve 13 is not operated by a small slug of water in an otherwise solid stream of oil. It has been found that a suitable time delay when oil is detected is of the order of about one second while a suitable time delay when water is detected is of the order of 5 to 10 seconds.

In operation, when the fluid in pipe 11 has an oil content less than the predetermined level, e.g., less than about 2%, relay 22 will be in a condition thereof in which valve 13 passes fluid from pipe 12 to pipe 15. When the oil content of the fluid in pipe 11 exceeds the predetermined level, capacitance probe 21 will produce an output which, after the set time delay, e.g., one second, will cause relay 22 to shift to another condition thereof in which valve 13 connects pipe 12 to pipe 16. Valve 13 will be returned to its initial condition when the oil content of the fluid in pipe 11 drops below the predetermined level and after the set time delay, e.g., 5–10 seconds.

Since the oil content of the ballast water tends largely to be either well below 2% or close to 100%, great sensitivity in capacitance probe 21 is not required. Hence probe 21 may be selected from among many available types. However, the probe 21 may, if desired, be made very sensitive to afford a control operation sensitive to small changes in oil content of the ballast water.

The measurement of the oil content of the ballast water need not be effected by capacitance means, although measurement of the dielectric content is deemed to be the most suitable measurement scheme for this purpose. Other measurement means, e.g., optical inspection, may be used.

The mixture of fuel oil and sea water in slop tank 20 may be disposed of in any desired way. For example, the slop tank may be pumped out into suitable disposal means on land or may be discharged overboard at a later time far out at sea. Or the slop tank mixture may be subjected to a separating operation at a later time when the high through-put requirement of the rapid deballasting operation is not present.

In a typical installation the ballast tanks might contain 500,000 gallons of sea water and 3,000 gallons of Bunker "C" oil. For this ballast, the slop tank 20 might be expected to receive about 10,000 gallons of sea water and substantially the entire 3,000 gallons of oil.

Referring now to FIG. 2, reference numerals corresponding to those of FIG. 1 denote like elements of apparatus. In FIG. 2, a dual purpose double bottom tank is shown at 23. Tank 23 is connected to a manifold 24 through a valve 25. Other tanks (not shown) may be connected to manifold 24 through valves 26, 27 and 28, respectively. Manifold 24 supplies fluid from the tank 23 (or other tank) to pipe 11 and from pipe 11 through ballast pump 10 to pipe 15 or pipe 16, depending on the dielectric constant of the fluid in pipe 11 as measured by capacitance probe 21. For oil content above the predetermined level, valve 13 will deliver the fluid to slop tank 20 while for oil content below the predetermined level, valve 13 will deliver the fluid to pipe 15.

A motor operated diverting valve 29 is interposed in pipe 15 between valve 13 and separator 17. Valve 29, depending on its setting, will deliver fluid to separator 17 or to a pipe 30. The setting of valve 29 is controlled by a controller 31 which measures the oil content of the ballast water in pipe 15. Controller 31 operates valve 29 to the position thereof in which fluid is delivered to pipe 30 when the oil content of the ballast fluid is sufficiently low that the ballast fluid may be pumped directly overboard without a separation operation. When the oil content of the ballast fluid is greater than the value selected for direct overboard discharge, valve 29 will, under control of controller 31, deliver the fluid to separator 17 for treatment. The treated oil-free water output of separator 17 is supplied to pipe 30 through a pipe 32 for discharge overboard.

Another motor operated diverting valve 33 is interposed in pipe 30 downstream of the junction of pipes 30 and 32. Valve 33 is controlled by a controller 34 which measures the oil content of the ballast water in pipe 30. Normally valve 33 delivers the water in pipe 30 to overboard discharge pipe 35. However, if the oil content of the water in pipe 30 exceeds the allowable level for overboard discharge, controller 34 may be set to operate valve 33 so as to supply the water from pipe 30 to a pipe 36 which is connected to pipe 11 at the suction side of ballast pump 10. Simultaneously with diverting the ballast water to the suction side of the pump 10, controller 34 will also shut down pump 10 to permit investigation of the cause of excess oil content in the water flowing through pipe 30. For example, the separator 17 might need cleaning or recycling or one of the other measuring devices might not be operating properly.

The controllers 31 and 34 might employ sensitive capacitance probes to measure the oil content in pipes 15 and 30, respectively, or they might use other measuring devices. For example, measurement might be effected by an optical system. Such a system might employ a photoelectric cell to inspect a further emulsified side stream withdrawn from the pipe in question. The side stream would pass through a transparent tube after agitation to produce emulsification of the oil in the water. A beam of light would be passed through the transparent tube and would impinge on the photocell. The greater the quantity of oil in the water, the less would be the light impinging on the photocell so that the photocell output would be inversely related to the oil level in the water. The photocell output would be supplied to a relay, a thyratron circuit or other trigger device to operate valve 29 or 33, as the case may be at a photocell output level corresponding to the selected oil level.

It will usually be desirable to provide a recorder in association with controller 34 to provide a permanent record of the oil content of the ballast water discharged overboard. It will also usually be desirable to provide a visual and/or audible alarm to alert operating personnel to the diversion of ballast water to the suction side of pump 10 and the shutting down of pump 10 upon operation of controller 34.

Where the oil content of the water in slop tank 20 is not too high, and when the separator 17 is not being used to handle ballast water from one of the ballast tanks, fluid may be withdrawn from tank 20 through a pipe 37, a valve 38, pipe 11 and pump 10. In such case the automatic diversion of the fluid to tank 20 by operation of capacitance probe 21 may be manually overridden so that the fluid from tank 20 will be supplied to separator 17. Pipe 37 and valve 38 may also be used to permit overflow from tank 20 to flow into one of the ballast tanks, in case tank 20 should become too full.

If the ballast water flowing through pipe 15 should exceed the capacity of the separator 17, a portion of that ballast water could be passed to a temporary storage tank (not shown) and be held for later processing.

While the invention has been described in connection with specific embodiments thereof and in a specific use, various modifications thereof will occur to those skilled in the art without departing from the spirit and scope of the invention as set forth in the appended claims.

What is claimed is:

1. The method of separating residual fuel oil from ballast water, comprising the steps of withdrawing ballast water from a ballast tank, continuously measuring the oil content of said withdrawn ballast water, passing said withdrawn ballast water to an oil-water separator when the oil content of said withdrawn ballast water is below a predetermined level, diverting said withdrawn ballast water to a slop tank instead of to said separator, only when the oil content of said withdrawn ballast water is above said predetermined level, delaying the commencement of said diverting step for a predetermined substantial time interval after said continuous measurement step shows the oil content of said withdrawn ballast water to be above said predetermined level, separating oil from said ballast water in said oil-water separator, withdrawing substantially oil-free water from said oil-water separator, and withdrawing oil-containing residue from said oil-water separator.

2. The method of separating oil from residual oil-containing water, comprising the steps of withdrawing said oil-containing water from a supply; continuously measuring the oil content of said withdrawn oil-containing water; passing said withdrawn oil-containing water to an oil-water separator, separating oil from said withdrawn oil-containing water, withdrawing substantially oil-free water from said separator and withdrawing an oil-containing residue from said separator; automatically diverting said withdrawn oil-containing water to storage rather than to said separator when said measurement shows an oil content in said withdrawn oil-containing water greater than a first predetermined amount; further measuring the oil content of said withdrawn oil-containing water; and automatically diverting said withdrawn oil-containing water to a discharge line rather than to said separator and storage when said further measurement shows said withdrawn oil-containing water to have an oil content less than a second predetermined amount.

3. The method of separating residual fuel oil from ballast water, comprising the steps of withdrawing ballast water from a ballast tank; continuously measuring the oil content of said withdrawn ballast water; passing withdrawn oil-containing ballast water to an oil-water separator, separating oil from said withdrawn oil-containing water, withdrawing substantially oil-free water from said separator and withdrawing an oil residue from said separator, automatically diverting said withdrawn ballast water to a slop tank rather than to said separator when said measurement shows an oil content in said withdrawn ballast water greater than a first predetermined amount; further measuring the oil content of said withdrawn ballast water and automatically diverting said withdrawn ballast water to a discharge line rather than to said separator and slop tank when said further measurement shows said withdrawn ballast water to have an oil content less than a second predetermined amount.

4. The method of separating residual fuel oil from ballast water, comprising the steps of withdrawing ballast water from a ballast tank, continually measuring the oil content of said withdrawn ballast water, passing said withdrawn ballast water to an oil-water separator in which said withdrawn ballast water is separated into a substantially oil-free water stream and an oil residue, automatically diverting said withdrawn ballast water to a slop tank rather than to said separator when said measurement shows an oil content in said withdrawn ballast water greater than a first predetermined amount, further measuring the oil content of said withdrawn ballast water, automatically diverting said withdrawn ballast water to a discharge line rather than to said separator and slop tank when said further measurement shows said withdrawn ballast water to have an oil content less than a second predetermined amount, supplying said oil-free stream to said discharge line, additionally measuring the oil content of the water in said discharge line, and automatically stopping the withdrawal of ballast water from said ballast tank when said additional measurement shows the oil content of the water in said discharge line to be greater than a third predetermined amount.

5. The method of separating residual fuel oil from ballast water, comprising the steps of pumping ballast water from a ballast tank, continuously measuring the oil content of said pumped ballast water, passing said pumped ballast water to an oil-water separator in which said pumped ballast water is separated into a substantially oil-free water stream and an oil residue, automatically diverting said pumped ballast water to a slop tank rather than to said separator when said measurement shows an oil content in said pumped ballast water greater than a first predetermined amount, further measuring the oil content of said pumped ballast water, automatically diverting said pumped ballast water to a discharge line rather than to said separator and slop tank when said further measurement shows said pumped ballast water to have an oil content less than a second predetermined amount, supplying said oil-free stream to said discharge line, additionally measuring the oil content of the water in said discharge line, and automatically stopping the pumping of ballast water from said ballast tank and connecting said discharge line to the suction side of the pump when said additional measurement shows the oil content of the water in said discharge line to be greater than a third predetermined amount.

6. The method set forth in claim 3 in which said first mentioned measurement step comprises measuring the dielectric constant of said withdrawn ballast water.

7. The method set forth in claim 4 in which said first mentioned measurement step comprises measuring the dielectric constant of said withdrawn ballast water, said further measurement step comprises measuring the optical density of said withdrawn ballast water, and said additional measurement step comprises measuring the optical density of the water in said discharge line.

8. The method set forth in claim 3, comprising the steps of delaying the commencement of said first mentioned diverting step for a first predetermined substantial time interval after said first mentioned measurement shows an oil content in said withdrawn ballast water greater than said first predetermined amount, and delaying the ending of said first mentioned diverting step for a second predetermined substantial time interval after said first mentioned measurement shows an oil content in said withdrawn ballast water less than said first predetermined amount.

9. The method set forth in claim 8 in which said first predetermined time interval is of the order of about 1 second and said second predetermined time interval is of the order of about 1 to 10 seconds.

10. Apparatus for separating residual fuel oil from the ballast water contained in a ballast tank, comprising a ballast pump; a first fluid line intercoupling said ballast tank and the suction side of said pump; a slop tank; an oil-water separator, an oil-contaminated water inlet on said separator, a separated water outlet on said separator and a separated oil outlet on said separator; a first diverting valve having an inlet connected to the discharge of said pump, one outlet connected to said slop tank and another outlet connected to said oil-water separator; oil-content sensing means operatively coupled to said first fluid line; means coupled to said sensing means to operate said first valve to a position in which ballast water is supplied to said slop tank when the oil content in said ballast water is above a first predetermined level and to operate said first valve to another position in which said ballast water is supplied to said separator when the oil content in said ballast water is below said first predetermined level; a second diverting valve interposed in said connection between said other outlet of said first diverting valve and said separator; a discharge line, said second diverting valve having one outlet connected to said separator and another outlet connected to said discharge line; and means arranged to control said second diverting valve to supply said ballast water to said separator when the oil content in said ballast water is above a second predetermined level and to supply said ballast water to said discharge line when the oil content in said ballast water is below said second predetermined level.

11. Apparatus as set forth in claim 10, comprising delay means connected between said oil content sensing means and said first valve operating means to delay for a predetermined substantial time interval said operation of said first valve to a position in which ballast water is supplied to said slop tank.

12. Apparatus as set forth in claim 10, comprising means connected between said oil content sensing means and said first valve operating means to delay, for respective predetermined substantial time intervals, said operations of said first valve to said positions in which ballast water is supplied to said slop tank and to said separator.

13. Apparatus for separating residual fuel oil from the ballast water contained in a ballast tank, comprising a ballast pump; a first fluid line intercoupling said ballast tank and the suction side of said pump; a slop tank, an oil-water separator having an oil-contaminated water inlet, a separated oil outlet and a separated water outlet; a first diverting valve having an inlet connected to the discharge of said pump, one outlet connected to said slop tank and another outlet connected to said oil-contaminated water inlet of said separator; first oil-content sensing means operatively coupled to said first fluid line; means coupled to said first sensing means to operate said first valve to a position in which ballast water is supplied to said slop tank when the oil content in said ballast water is above a first predetermined level and to operate said first valve to another position in which said ballast water is supplied to said separator when the oil content in said ballast water is below said first predetermined level; a second diverting valve interposed in said connection between said other outlet of said first diverting valve and said oil-contaminated water inlet of said separator; a discharge line, said second diverting valve having one outlet connected to said oil-contaminated water inlet of said separator and another outlet connected to said discharge line; second oil-content sensing means operatively coupled to said connection between said first and second diverting valves and arranged to control said second diverting valve to supply said ballast water to said separator when the oil content in said ballast water is above a second predetermined level and to supply said ballast water to said discharge line when the oil content in said ballast water is below said second predetermined level; and means to connect the separated water outlet of said separator to said discharge line.

14. Apparatus for separating residual fuel oil from the ballast water contained in a ballast tank, comprising a ballast pump; a first fluid line intercoupling said ballast tank and the suction side of said pump; a slop tank, an oil-water separator having an oil-contaminated water inlet, a separated oil outlet and a separated water outlet; a first diverting valve having an inlet connected to the discharge of said pump, one outlet connected to said slop tank and another outlet connected to said oil-contaminated water inelt of said separator; first oil-content sensing means operatively coupled to said first fluid line; means coupled to said first sensing means to operate said first valve to a position in which ballast water is supplied to said slop tank when the oil content in said ballast water is above a first predetermined level and to operate said first valve to another position in which said ballast water is supplied to said separator when the oil content in said ballast water is below said first predetermined level; a second diverting valve interposed in said connection between said other outlet of said first diverting valve and said oil-contaminated water inlet of said separator; a discharge line, said second diverting valve having one outlet connected to said oil-contaminated water inlet of said separator and another outlet connected to said discharge line; second oil-content sensing means operatively coupled to said connection between said first and second diverting valves and arranged to control said second diverting valve to supply said ballast water to said separator when the oil content in said ballast water is above a second predetermined level and to supply said ballast water to said discharge line when the oil content in said ballast water is below said second predetermined level; means to connect the separated water outlet of said separator to said discharge line; a third diverting valve interposed in said discharge line downstream of said last mentioned connection and having a discharge outlet and another outlet connected to the suction side of said pump; third oil-content sensing means operatively coupled to said discharge line downstream of said means to connect the separated water outlet to said discharge line, and arranged to control said third diverting valve to discharge water in said discharge line when the oil content in said discharge line is below a third predetermined level and to supply the water in said discharge line to said suction side of said pump when the oil content in said discharge line is above said third predetermined level; and means controlled by said third sensing means to shut down said pump when the oil content in said discharge line is above said third predetermined level.

References Cited by the Examiner

UNITED STATES PATENTS

| | | | |
|---|---|---|---|
| 1,406,950 | 2/1922 | Fackert | 210—83 |
| 1,481,901 | 1/1924 | Hapgood | 210—96 X |
| 1,505,791 | 8/1924 | Lenz et al. | 210—96 X |
| 1,586,449 | 5/1926 | Jones | 210—83 X |
| 1,903,957 | 4/1933 | Clark | 210—85 |
| 2,295,366 | 9/1942 | Stout | 210—85 X |
| 2,299,529 | 10/1942 | Crampton | 210—96 |
| 2,323,876 | 7/1943 | Rickett | 210—85 X |
| 2,377,363 | 6/1945 | Noble et al. | 210—143 X |
| 2,468,188 | 4/1949 | Frankenhoff | 210—96 X |
| 2,588,981 | 3/1952 | Hole | 210—85 X |
| 2,617,439 | 11/1952 | Fellows et al. | 137—93 |
| 2,657,700 | 11/1953 | Ray | 137—93 |
| 2,716,052 | 8/1955 | Felger. | |
| 2,859,757 | 11/1958 | Parsons | 137—2 |
| 3,031,105 | 4/1962 | Walker | 137—119 X |

REUBEN FRIEDMAN, *Primary Examiner.*

ROBERT F. BURNETT, *Examiner.*

J. DE CESARE, D. TALBERT, *Assistant Examiners.*